(12) United States Patent
Spencer et al.

(10) Patent No.: US 8,714,622 B2
(45) Date of Patent: May 6, 2014

(54) SPRING RETAINER FOR TONNEAU COVER

(71) Applicant: Truxedo, Inc., Yankton, SD (US)

(72) Inventors: Michael R. Spencer, Hubbard, NE (US); Tim Nelson, Yankton, SD (US)

(73) Assignee: Truxedo, Inc., Yankton, SD (US)

( * ) Notice: Subject to any disclaimer, the term of this patent is extended or adjusted under 35 U.S.C. 154(b) by 0 days.

(21) Appl. No.: 13/660,104

(22) Filed: Oct. 25, 2012

(65) Prior Publication Data

US 2013/0106134 A1 May 2, 2013

Related U.S. Application Data

(60) Provisional application No. 61/552,006, filed on Oct. 27, 2011.

(51) Int. Cl.
*B60P 7/02* (2006.01)

(52) U.S. Cl.
USPC ............. 296/100.18; 296/100.01; 296/100.17

(58) Field of Classification Search
USPC ................... 296/100.01, 101, 100.17, 100.18
See application file for complete search history.

(56) References Cited

U.S. PATENT DOCUMENTS

| | | | |
|---|---|---|---|
| 4,273,377 A | 6/1981 | Alexander | |
| 4,730,866 A * | 3/1988 | Nett | 296/100.18 |
| 4,838,602 A * | 6/1989 | Nett | 296/100.18 |
| 5,350,213 A | 9/1994 | Bernardo | |
| 5,427,428 A | 6/1995 | Ericson et al. | |
| 5,860,691 A * | 1/1999 | Thomsen et al. | 296/100.18 |
| 5,984,400 A * | 11/1999 | Miller et al. | 296/100.15 |
| 6,676,189 B2 * | 1/2004 | Schall et al. | 296/100.12 |
| 6,824,191 B2 * | 11/2004 | Wheatley | 296/100.17 |
| 7,004,530 B2 * | 2/2006 | Marx et al. | 296/100.12 |

FOREIGN PATENT DOCUMENTS

| | | |
|---|---|---|
| KR | 10-0843563 | 7/2008 |
| WO | WO 99-36290 | 7/1999 |

OTHER PUBLICATIONS

International Search Report and Written Opinion dated Mar. 21, 2013 from corresponding International Patent Application No. PCT/US2012/062192 (eight pages).

* cited by examiner

*Primary Examiner* — Lori Lyjak
(74) *Attorney, Agent, or Firm* — Harness, Dickey & Pierce, P.L.C.

(57) ABSTRACT

A tonneau system for a pickup bed comprising a bracket system connectable with a sidewall of the pickup bed, a header system, and a spring retainer system operably coupled between the bracket system and the header system. The spring retainer system can be biased into a locked position wherein the header system is coupled with the bracket system. The spring retainer system can be positionable into an unlocked position wherein the header system is decoupled from the bracket system.

19 Claims, 10 Drawing Sheets

SPRING RETAINER FOR TONNEAU COVER

CROSS-REFERENCE TO RELATED APPLICATIONS

This application claims the benefit of U.S. Provisional Application No. 61/552,006, filed on Oct. 27, 2011. The entire disclosure of the above application is incorporated herein by reference.

FIELD

The present disclosure relates to storage systems for vehicles. More particularly, the present disclosure relates to a spring retaining system for use in a tonneau cover system.

BACKGROUND

This section provides background information related to the present disclosure which is not necessarily prior art.

Pickups are a popular type of vehicle because, at least in part, the pickup enables objects of various sizes to be placed in the bed of the pickup and then transported. The bed of the pickup generally has a floor surface that is bounded by a front wall, side walls and a back wall. At least one of the front wall, the side walls and the back wall may be movable to facilitate placing objects into the bed and removing objects from the bed.

Covers are often used to enclose the bed of the pickup to conceal or otherwise protect the contents of the bed. These covers are typically soft tonneau covers that can be removed or folded or are hard bed covers that are generally planar and may be of unitary construction or are segmented to be stacked in a bi or tri-fold type configuration. These covers can be positioned in an extended position generally covering the bed or in a stowed position generally exposing at least a portion of the bed.

In many circumstances, a soft-type tonneau cover is preferred in order to provide simplified storage of the retracted tonneau cover, variable concealment positions, convenient installation and removal, and/or reliable concealment of the bed. However, in some conventional soft-type tonneau cover systems, assembly of the soft-type tonneau cover to the support structure can be difficult and, in some cases, cumbersome. In particular, in some conventional soft-type tonneau cover systems, a header assembly, which carries the rolled-up soft-type tonneau cover, can be difficult to install, remove, and/or fasten to the support structure mounted to the walls of the pickup.

Therefore, there exists a need to provide a soft-type tonneau cover system that is capable of providing sufficient protection to the bed and/or its contents. Moreover, there exists a need to provide a soft-type tonneau cover system this is more easily configured, mounted, and/or removed from the pickup.

SUMMARY

This section provides a general summary of the disclosure, and is not a comprehensive disclosure of its full scope or all of its features.

According to the principles of the present teachings, a tonneau system for a pickup bed is provided comprising a bracket system connectable with a sidewall of the pickup bed, a header system, and a spring retainer system operably coupled between the bracket system and the header system. The spring retainer system can be biased into a locked position wherein the header system is coupled with the bracket system. The spring retainer system can be positionable into an unlocked position wherein the header system is decoupled from the bracket system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the several figures, a spring retainer system 10 will be described in connection with a soft-type tonneau cover system 200 of a pickup or other vehicle 300. The spring retainer system 10 is particularly well suited to simplify the mounting, removal, and operation of the header structure that supports the tonneau cover (which will be described in more detail herein).

Although the spring retainer system 10 will be described in connection with the header structure, it should be recognized that the design and construction of the spring retainer system 10 can be applicable and useful in any one of a number of connection scenarios, including connection of other members separate from the header structure. Moreover, the present teachings are particularly well-suited for use with the soft-type tonneau cover system 200, however it should be understood that spring retainer system 10 can also be used with a hard-type tonneau system or any other structure wherein a quick and reliable spring retainer system is beneficial.

According to the principles of the present teachings, the soft-type tonneau cover system, including spring retainer system 10, is provided for use with pickup 300. The soft-type tonneau cover system 200 enables pickup bed 302 to be selectively concealed or revealed based on the positioning of soft-type tonneau cover system 200 relative to pickup bed 302, as illustrated throughout the figures.

Figure 2:
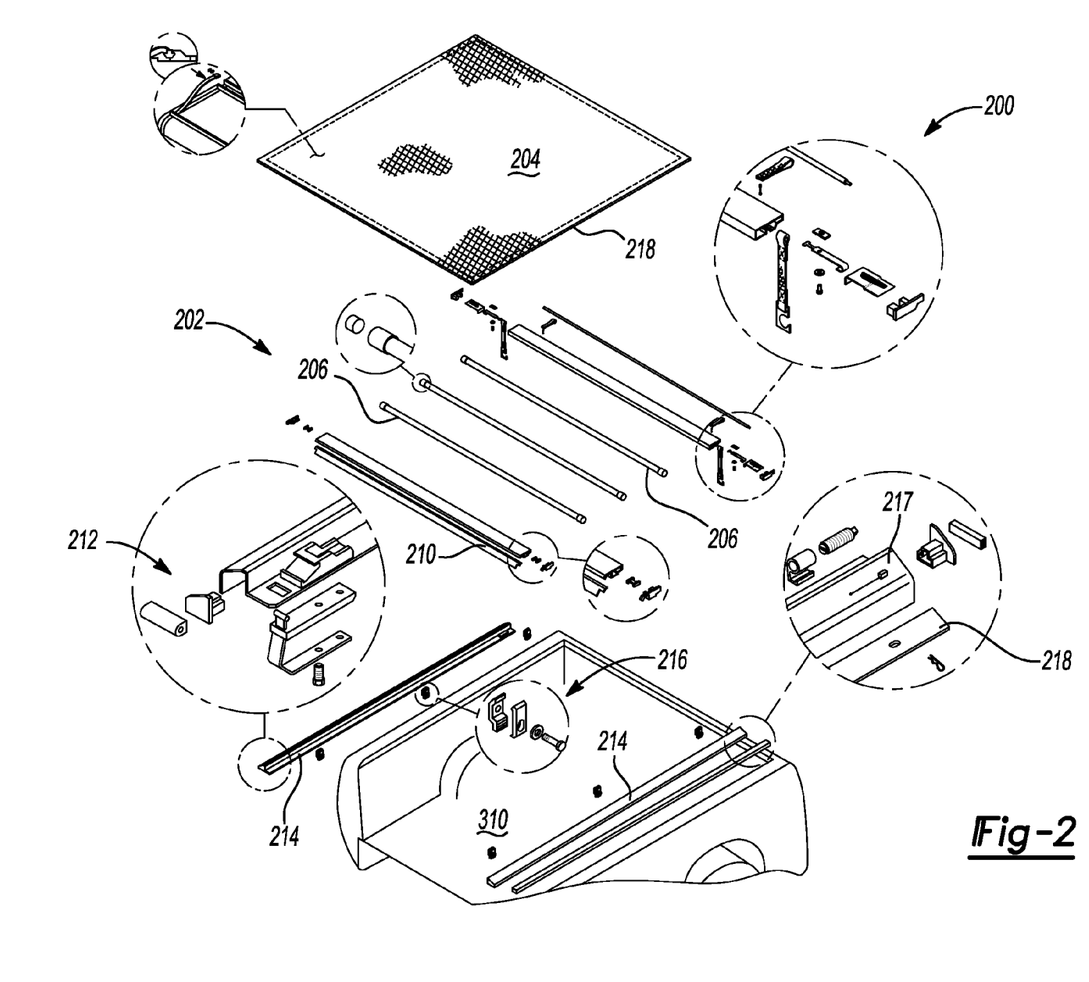
FIG. 2 is an exploded view of the soft-type tonneau cover system according to the present teachings.

Briefly, pickup bed 302 of pickup 300 can comprise a plurality of sidewalls, namely a front wall 304, a pair of sidewalls 306, and a rear wall or tailgate 308. These walls extend vertically from a bottom surface 310 (FIG. 2). Traditionally, walls 304, 306, 308 generally extend to a common height above bottom surface 310 and define an upper, generally flat, surface 312 extending about the top of walls 304, 306, 308.

Figure 1:
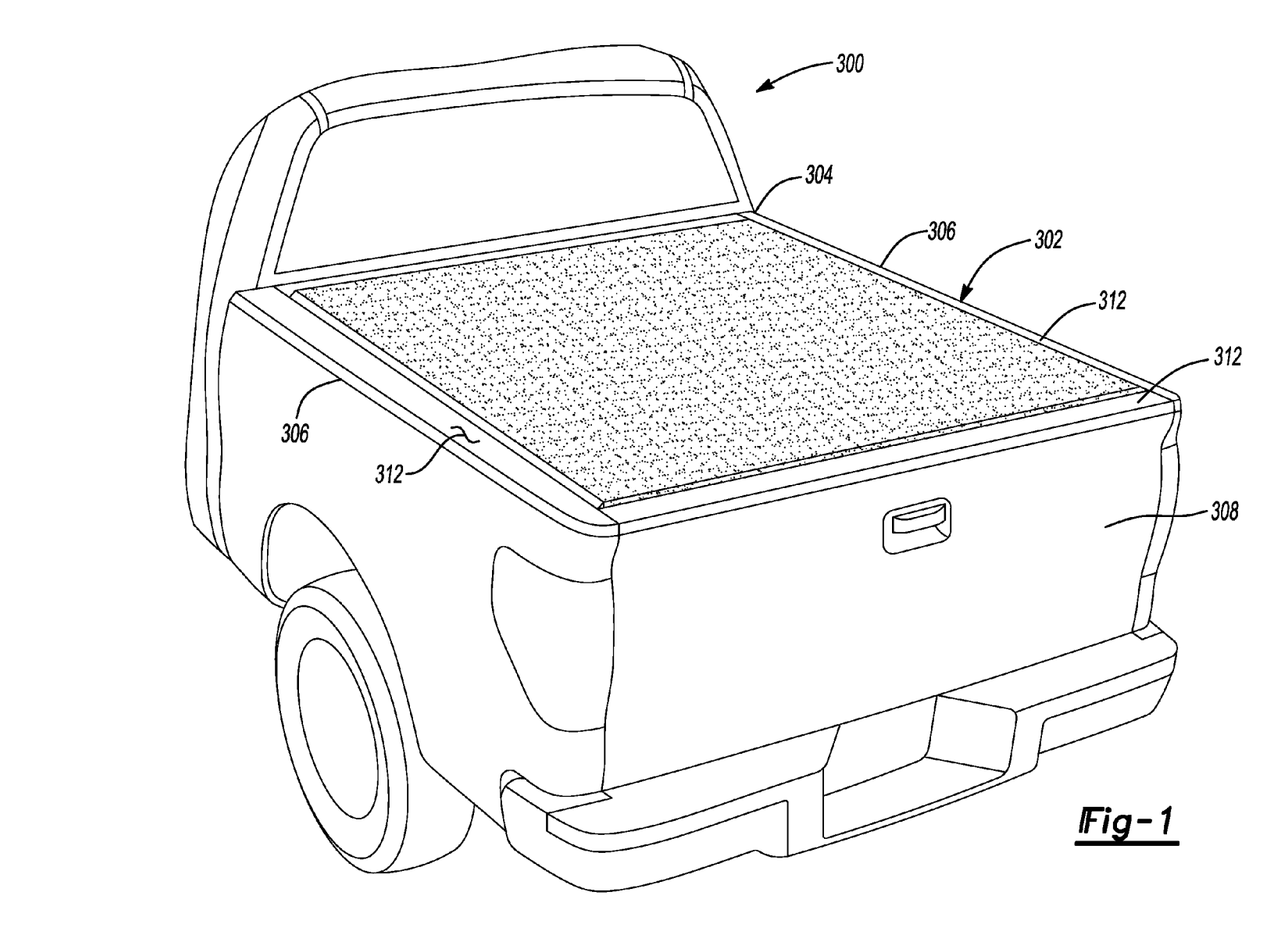
FIG. 1 is a perspective view of a pickup bed of a truck having a soft-type tonneau cover system according to the present teachings in an extended position.
Figure 3:
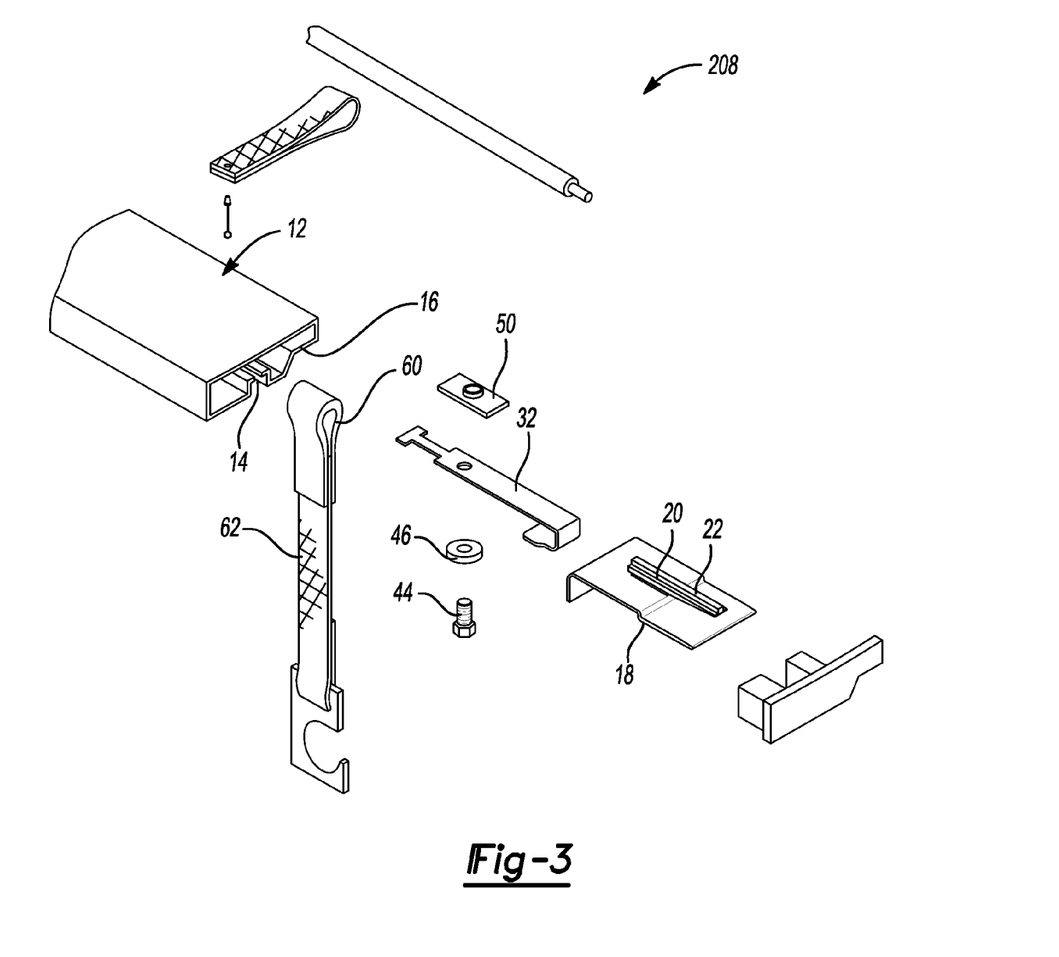
FIG. 3 is an enlarged exploded view of the spring retainer system according to the present teachings.

In some embodiments, as illustrated in FIGS. 1-3, soft-type tonneau cover system 200 can comprise a bracket system 202 for mounting to any one or more walls 304, 306, 308. In some embodiments, bracket system 202 can be mounted to sidewalls 306 to provide support soft-type tonneau cover system 200. More particularly, in some embodiments, soft-type tonneau cover system 200 can comprise a soft tonneau cover 204 that is supported by a plurality of cross-vehicle bows 206 that extend through and/or are coupled to tonneau cover 204. Each of the plurality of cross-vehicle bows 206 can comprise end caps and/or other hardware, if desired. A front header assembly 208 can be coupled to tonneau cover 204 for coupling tonneau cover 204 to bracket system 202 and, more particularly, front wall 304 of pickup 300. Front header assembly 208 will be described in detail herein. A rear header assembly 210 can similarly be coupled to tonneau cover 204 for coupling tonneau cover 204 to bracket system 202 and, more particularly, rear wall or tailgate 308 of pickup 300. Rear header assembly 210 is selectively connectable to tailgate 308, or at least side rails 214 that are coupled to sidewalls 306, via a releasable header stop and latch assembly 212.

With continued reference to FIG. 2, in some embodiments, side rails 214 can extend generally the length of sidewalls 306 of pickup bed 302. In some embodiments, side rails 214 can be fixedly coupled to sidewalls 306 via a clamp assembly 216 (see FIG. 2). Clamp assembly 216 can be made of aluminum and can comprise a pair of clamp members that are fastened together to clampingly engage a portion, such as a flange, of sidewalls 306. As illustrated in FIG. 2, side rails 214 can be mounted to surface 312 of walls 304, 306, 308, especially sidewalls 306. In some embodiments, side rails 214 comprise an inclined surface 217 having a fastener system 218, such as a hook and loop fastening system, coupled thereto. A complementary fastener piece can extend along side portions of soft tonneau cover 204 for releasably securing soft tonneau cover 204 to side rails 214.

With particular reference to FIGS. 3-16, front header assembly 208 will now be described in detail. In some embodiments, front header assembly 208 can comprise a front header 12 removably coupled in a cross-vehicle direction to side rails 214. Front header 12 can, in some embodiments, define a planar structure having a centrally-disposed T-shaped or cross-shaped channel 14 extending along an underside 16 thereof. It should be recognized that alternative shapes can be used.

Figure 4:
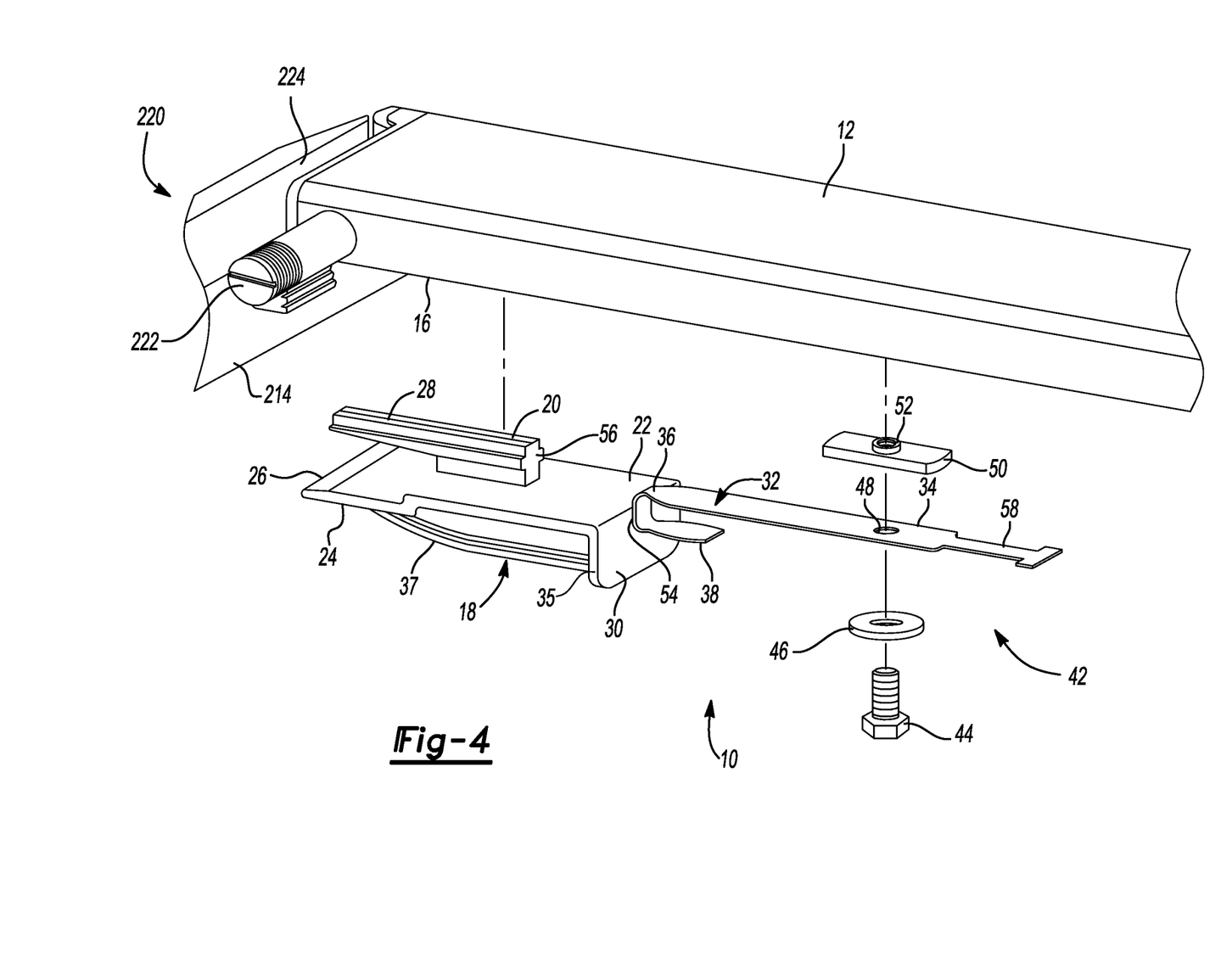
FIG. 4 is an exploded view of the spring retainer system according to the present teachings.

As illustrated in FIG. 4, soft-type tonneau cover system 200 can comprise a front header adjustment system 220 having an adjustment member 222 that is threadingly engaged with a mount member 224 extending from side rail 214. Front header adjustment system 220 can extend a variable distance past mount member 224 and engage front header 12 to position front header 12 in a desired fore and aft location.

T-shaped channel 14 of front header 12 can be shaped and sized to slidably receive a slidable header retaining member 18. As illustrated in FIGS. 3 and 4, header retaining member 18 can comprise a slot guide 20 extending upward from a top surface 22. As illustrated in FIG. 4, slot guide 20 can comprise a T-shaped or cross-shaped guide that is sized to be slidably received within channel 14 of front header 12. Header retaining member 18 can further comprise a distal engaging portion 24 having a tapered end portion 26. Distal engaging portion 24 can be offset or spaced apart a distance from top surface 22 such that, as illustrated in the several figures, header retaining member 18 can be slid outwardly or outboardly (in a cross-vehicle direction) to engage or capture a portion of side rail 214 between distal engaging portion 24 and underside 16 of front header 12. In some embodiments, slot guide 20 can comprise a cantilevered portion 28 that can further extending within channel 14 and further extend outboardly to engage or capture a portion of side rail 214.

On an opposing end of header retaining member 18 from distal engaging portion 24 is a proximal abutment portion 30. Proximal abutment portion 30 can be shaped to define any shape that is both comfortable for gripping by a user and reliable for engagement with a header retaining member lock 32. Proximal abutment portion 30 can include a flange portion 35 for gripping, if desired. Still further, header retaining member 18 can comprise one or more reinforcement members 37 for providing enhanced structural integrity. Header retaining member 18 can be made of any conducive material, including plastic, fiberglass, aluminum, and the like.

Figure 5:
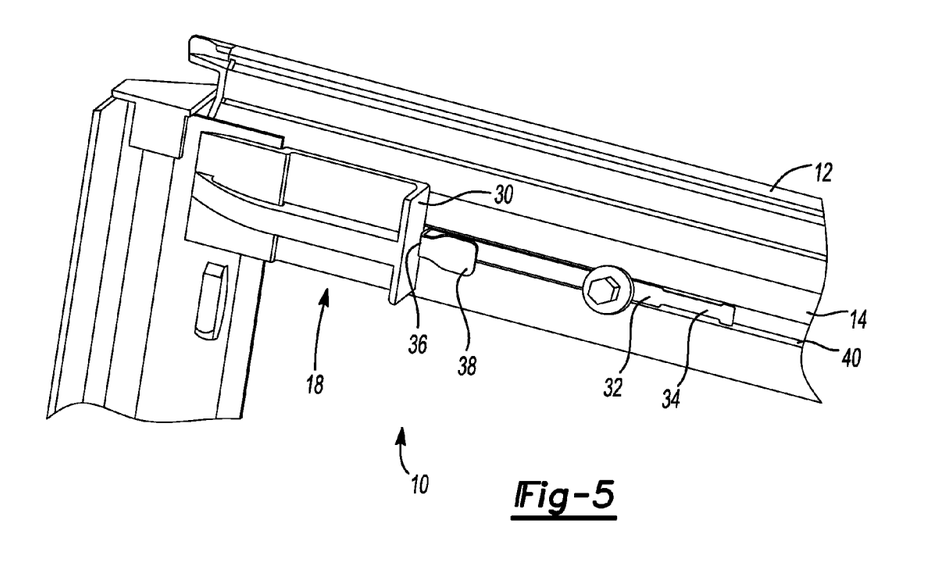
FIG. 5 is a bottom perspective view of the spring retainer system according to the present teachings in a locked position.
Figure 6:
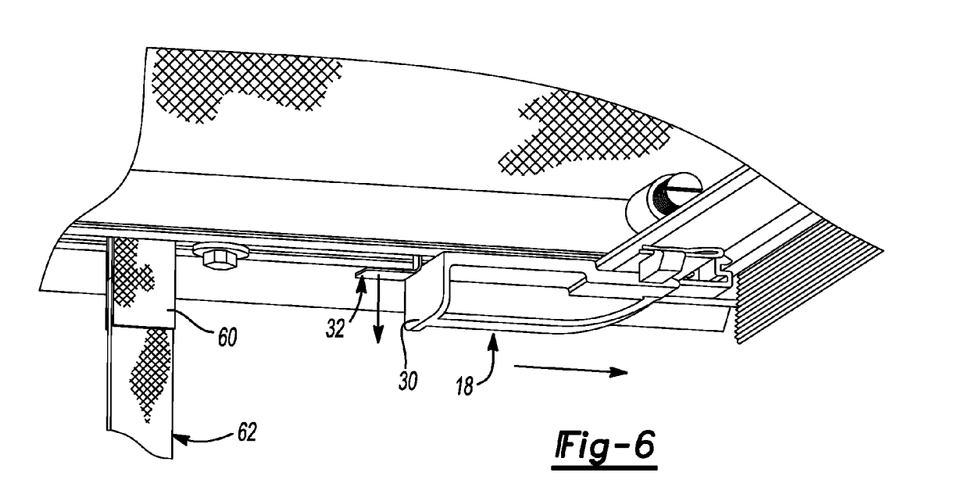
FIG. 6 is a bottom perspective view of the spring retainer system according to the present teachings in a locked position.
Figure 7:
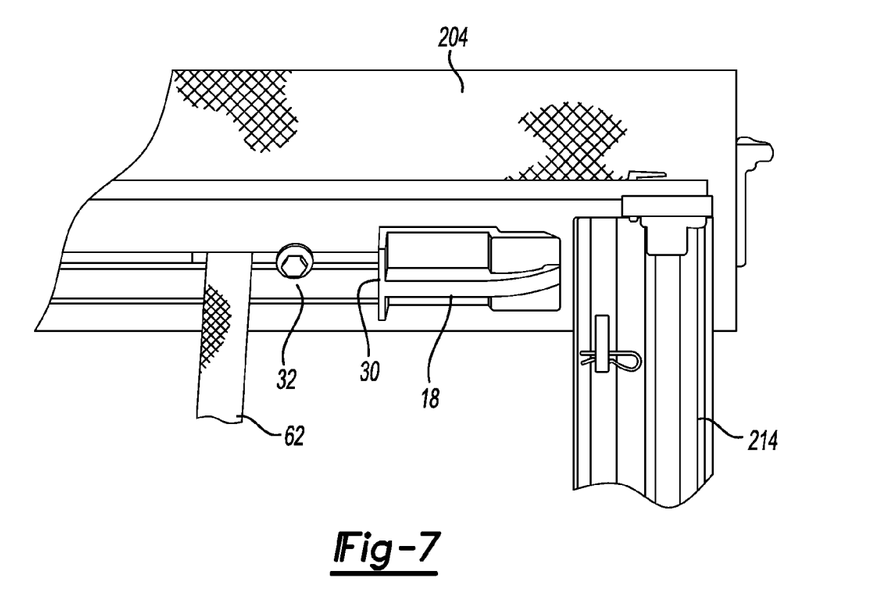
FIG. 7 is a perspective view of the spring retainer system according to the present teachings.
Figure 8:
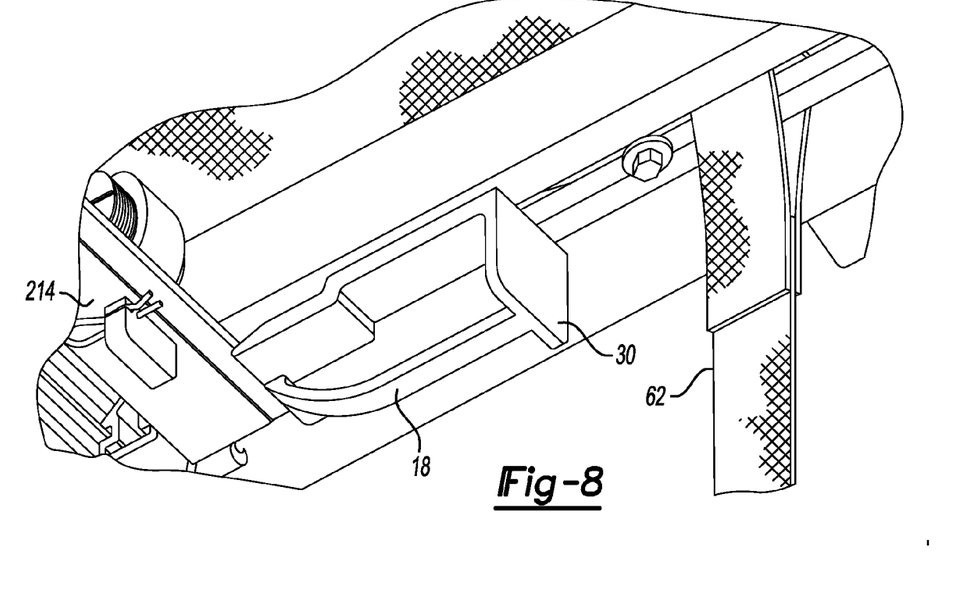
FIG. 8 is a perspective view of the spring retainer system according to the present teachings.
Figure 9:
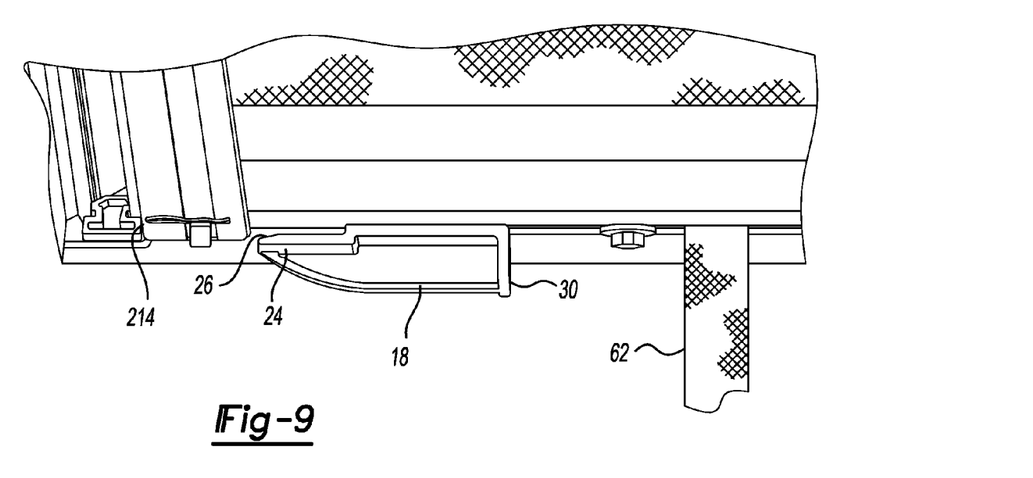
FIG. 9 is a perspective view of the spring retainer system according to the present teachings.
Figure 10:
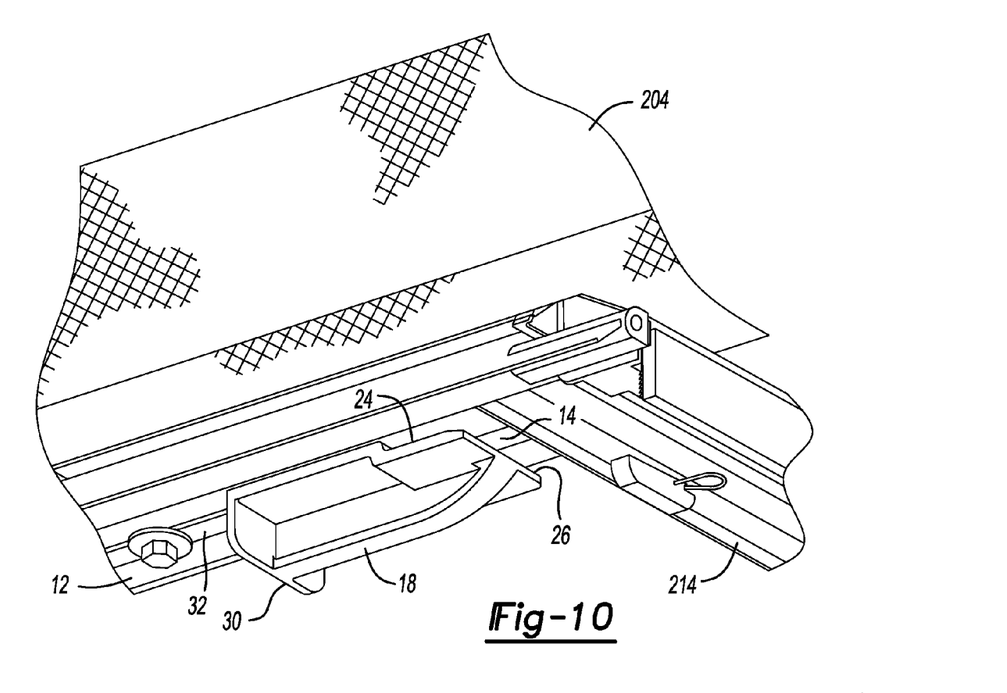
FIG. 10 is a perspective view of the spring retainer system according to the present teachings.
Figure 11:
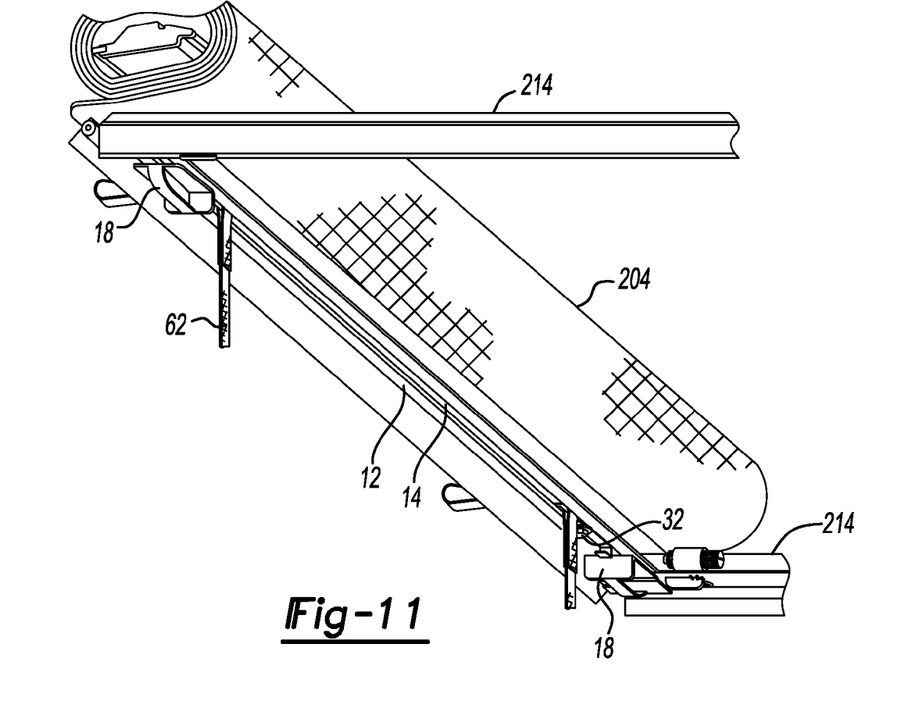
FIG. 11 is a perspective view of the spring retainer system according to the present teachings.
Figure 12:
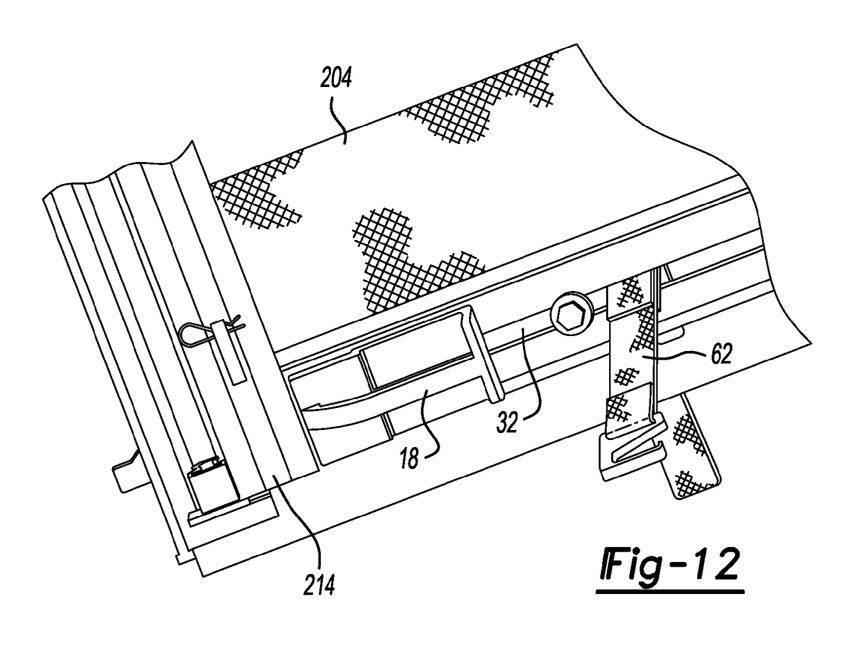
FIG. 12 is a perspective view of the spring retainer system according to the present teachings.
Figure 13:
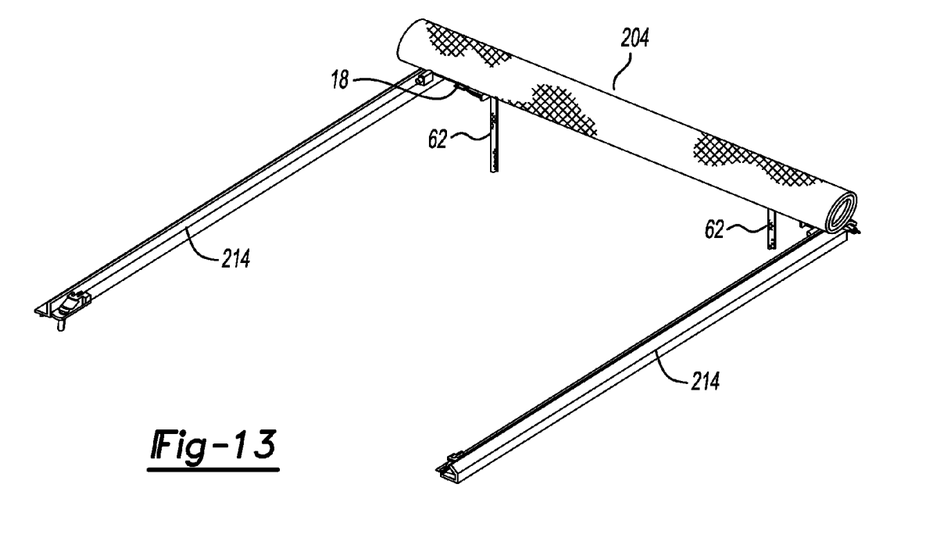
FIG. 13 is a perspective view of the spring retainer system according to the present teachings.
Figure 14:
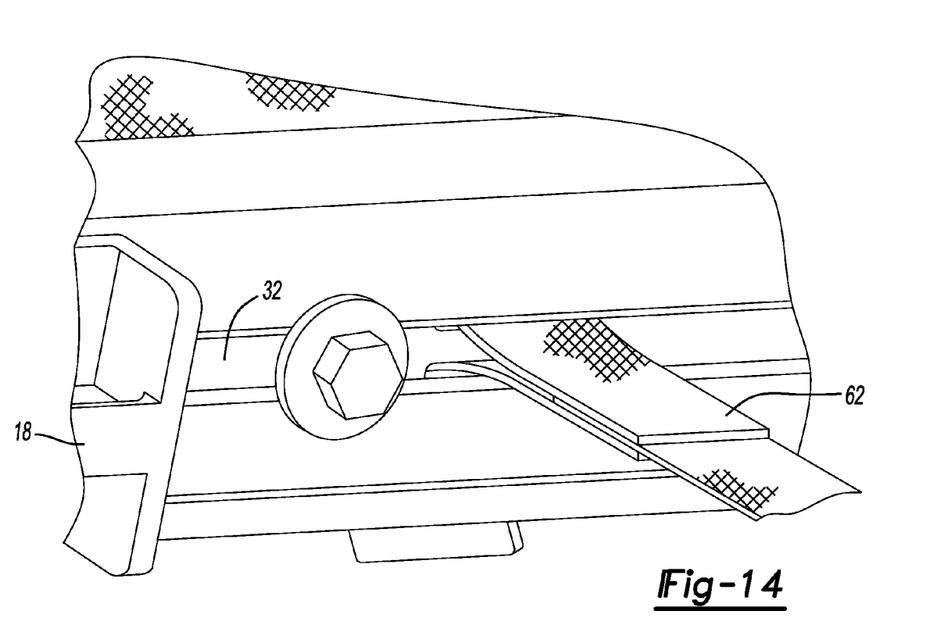
FIG. 14 is a perspective view of the spring retainer system according to the present teachings.
Figure 15:
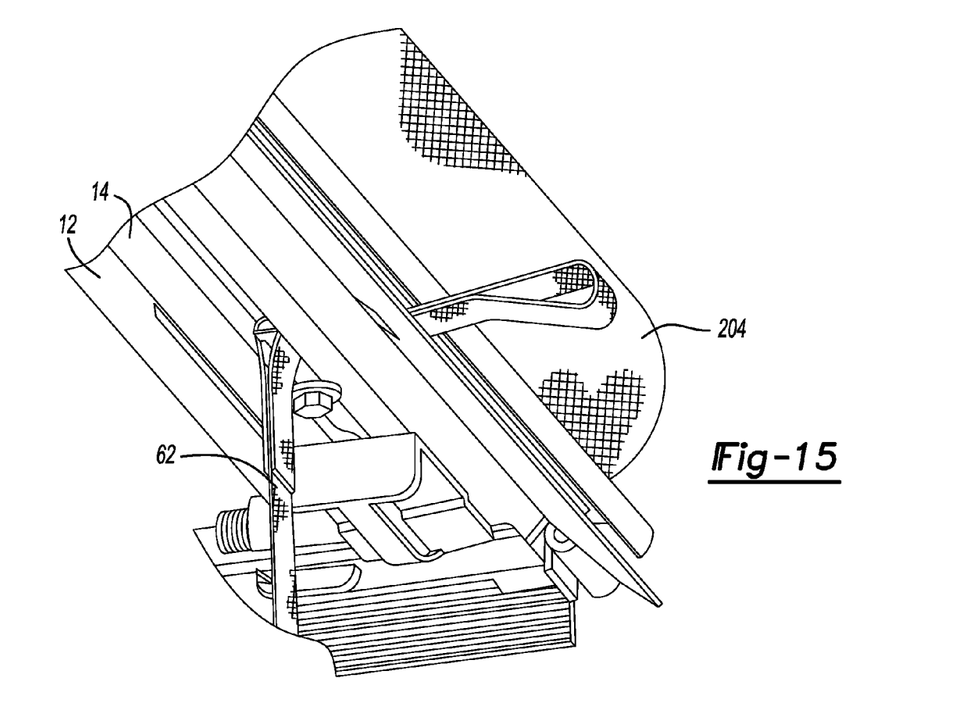
FIG. 15 is a perspective view of the spring retainer system according to the present teachings.
Figure 16:
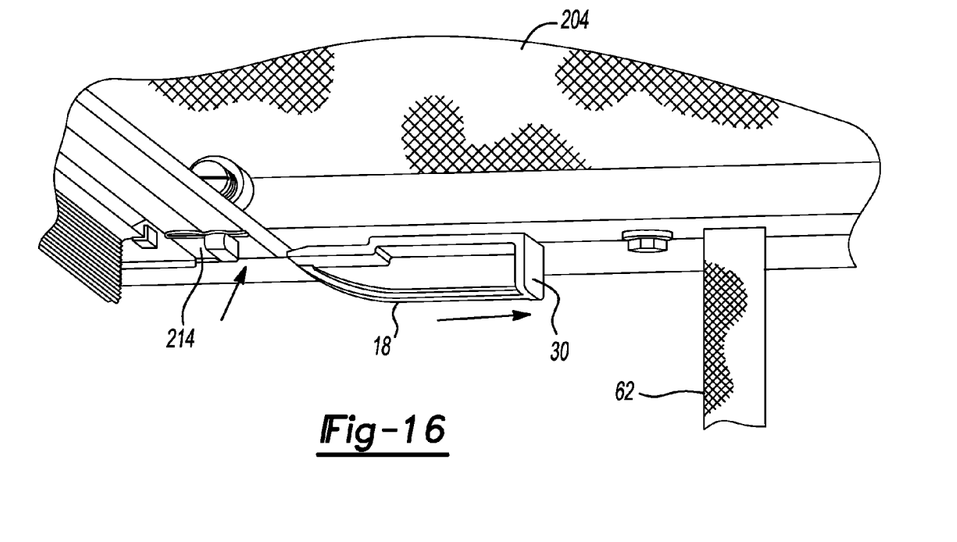
FIG. 16 is a perspective view of the spring retainer system according to the present teachings.

Spring retainer system 10 can further comprise header retaining member lock 32 being partially disposed with channel 14 of front header 12 (see FIG. 5). Header retaining member lock 32 can comprise a body portion 34, and elbow portion 36, and an enlarged head portion 38. Body portion 34 is sized to be slidably received within channel 14 of front header 12, yet remained captured within channel 14. That is, a width of body portion 34 of header retaining member lock 32 is less than a maximum width of channel 14 and greater than a width of the exposed slot width 40 of channel 14 (see FIG. 5).

Header retaining member lock 32, in some embodiments, can be coupled to front header 12 in a desired location via a fastening system 42. In some embodiments, as illustrated in FIG. 3-5, fastening system 42 can comprise a fastener 44 (e.g. cap screw), a washer 46, an aperture 48 formed in body portion 34 of header retaining member lock 32, and a weld nut 50 having a threaded aperture 52 formed therein. During installation, weld nut 50 can be fixedly coupled to body portion 34 of header retaining member lock 32 adjacent aperture 48 and header retaining member lock 32 can be slidably disposed within channel 14 of front header 12. Fastener 44, including washing 46, can be threadedly engaged with weld nut 50 from an exterior side of front header 12 such that, upon tightening, fastening system 42 exerts a clamping force upon front header 12 to maintain header retaining member lock 32 in a predetermined position.

In this position, elbow portion 36, having a width less than the exposed slot width 40 of channel 14, can extend from body portion 34 (which is contained within channel 14) to enlarged head portion 38 (which is external to channel 14). Elbow portion 36 can be turned or otherwise shaped to define a contacting surface 54, such as a flat surface for example, for contact abutment portion 30 of header retaining member 18. Body portion 34 of header retaining member lock 32 can define a length sufficient to permit elastic deformation during operation; namely, to permit elastic deformation of body portion 34 through application of an upward force applied to enlarged head portion 38 by a user to urge header retaining member lock 32 into a retracted and unlocked position. In this retracted and unlocked position, enlarged head portion 38 can be nested above header retaining member 18 to thereby disengage contacting surface 54 from abutment portion 30 to permit inboard retraction of header retaining member 18. Contact friction between enlarged head portion 38 of header retaining member lock 32 and header retaining member 18 can serve to retain header retaining member 18 in this retracted position. In some embodiments, contacting surface 54 can be used to abut a retraction limit surface 56 (FIG. 4) formed on slot guide 20, to provide a positive stop limit for retraction.

As illustrated in FIG. 4, header retaining member lock 32 can further comprise a narrowed portion 58 formed in body portion 34. Narrowed portion 58 can be used to capture and retaining a loop portion 60 of a safety strap 62. Safety strap 62 can be used to restrain or otherwise contain tonneau cover 204 when rolled-up in a retracted position. Tonneau cover 204 can thus be coupled and retained on front header 12, thereby permitting removal of tonneau cover 204 from side rails 214 (and pickup 300) when desired.

More particularly, during installation of tonneau cover 204 and front header 12 to side rails 214 mounted on pickup 300, front header 12 can be placed in a cross-vehicle direction such that ends of front header 12 are placed upon side rails 214. Weight of front header 12 and tonneau cover 204 can thus be carried by side rails 214, sidewalls 306 of pickup 300. Once front header 12 is placed on side rails 214, header retaining members 18 (in mirrored orientation on opposing ends of front header 12) are manually actuated by the user in an outward or outboard direction such that distal engaging portion 24 engages or capture a portion of side rail 214 between distal engaging portion 24 and underside 16 of front header 12. Once abutment portion 30 slides past elbow portion 36 of header retaining member lock 32, the biasing force of header retaining member lock 32 causes header retaining member lock 32 to snap downward into a locked position. In this locked position, elbow portion 36, namely contacting surface 54, contacts abutment portion 30 and prevents inboard retraction of header retaining members 18. In this position, front header 12 is firmly and safely locked into engagement with side rails 214.

During removal of tonneau cover 204 and front header 12, an opposite operation can be completed—namely, header retaining member locks 32 can be urged upward such that header retaining member locks 32 are received within channel 14. Once header retaining member locks 32 are disengaged from abutment portion 30 of header retaining members 18, header retaining members 18 can be manually slid inboard and, thus, disengaged from side rails 214. Tonneau cover 204 and front header 12 can then be removed from pickup 300.

It should be understood that alternatives exist in connection with the present teachings. In some embodiments, a ratchet system can be used. That is, a one-way ratchet system can be affixed to either front header 12 or header retaining member 18 that permits header retaining member 18 to move freely in an outboard direction, but prevents movement in an inboard direction. This ratchet system can have multiple engagement teeth or simply singular lock/release positions. In some embodiments, a cam lever can be coupled with the header retaining member 18 and channel 14 to cammingly or clampingly engage header retaining member 18 relative to front header 12 when in an engaged position. Finally, in some embodiments a thumb screw can be used that extend through the header retaining member 18 and threadedly engages a slide within the channel 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau system for a pickup bed, said tonneau system comprising:
   a side rail connectable with a sidewall of the pickup bed;
   a header system having a header member and a channel extending at least partially through said header member; and
   a retainer system operably coupled between said side rail and said header system, said retainer system having a header retaining member slidably disposed within said channel of said header, said header retaining member being positionable into a header engaging position coupling said header system to said side rail and positionable into a header disengaging position decoupling said header system from said side rail, said retainer system further having a header lock being selectively coupled within at least a portion of said channel of said header system, said header lock being biased into a locked position whereby said header lock prevents said header retaining member to move from said header engaging position to said header disengaging position, said header lock being positionable into an unlocked position whereby said header lock is depressed to a position at least partially within said channel thereby permitting said header retaining member to slide within said channel from said header engaging position to said header disengaging position.

2. The tonneau system according to claim 1 wherein said header lock engages said header retaining member when said header lock is in said locked position.

3. The tonneau system according to claim 1 wherein said header lock retaining said header retaining member when said header lock is in said unlocked position.

4. The tonneau system according to claim 1 wherein said channel of said header member comprises a slot extending therealong having a width.

5. The tonneau system according to claim 4 wherein said header lock is selectively coupled to said header system via a fastening system, said fastening system having a fastener extending through said header lock and said slot of said channel, said fastener threadedly engaging a nut such that said fastening system engages and retains said header lock in a position relative to said header.

6. The tonneau system according to claim 4 wherein said header lock comprises:
   a body portion having a width being greater than said width of said slot;
   an elbow portion extending from an end of said body portion, said elbow portion having a width that is less than a width of said slot and extending through said slot; and
   a head portion extending from said elbow portion, said head portion having a width greater than said width of said slot.

7. The tonneau system according to claim 6 wherein said elbow portion is engageable with said header retaining member when said header lock is in said locked position.

8. The tonneau system according to claim 4 wherein said header retaining member comprises:
   a body portion having a distal engaging portion; and
   a slot guide member extending from said body portion, said slot guide member being received and slidably retained within said channel, a portion of said slot guide member extending through said slot of said channel,
   wherein said body portion and said slot guide member together are positionable into said header engaging position coupling said header system to said side rail such that said distal engaging portion engages said side rail and positionable into said header disengaging position.

9. The tonneau system according to claim 8 wherein said body portion of said header retaining member further comprises an abutment portion disposed opposite of said distal engaging portion, said abutment portion being engageable with said header lock in said locked position.

10. The tonneau system according to claim 1 wherein said header lock moves in a first direction between said locked position and said unlocked position, said header retaining member moves in a second direction between said header engaging position and said header disengaging position, said first direction being orthogonal to said second direction.

11. A tonneau system for a pickup bed, said tonneau system comprising:
   a side rail connectable with a sidewall of the pickup bed;
   a header member having a channel extending at least partially therethrough, said channel having a slot formed there along; and
   a header retaining member slidably disposed within said channel of said header, said header retaining member being positionable into a header engaging position coupling said header member to said side rail and positionable into a header disengaging position decoupling said header member from said side rail; and
   a header lock being selectively coupled within at least a portion of said channel of said header member, said header lock being biased into a locked position whereby said header lock prevents said header retaining member to move from said header engaging position to said header disengaging position, said header lock being positionable into an unlocked position whereby said header lock is depressed to a position at least partially within said channel thereby permitting said header retaining member to slide within said channel from said header engaging position to said header disengaging position.

12. The tonneau system according to claim 11 wherein said header lock is selectively coupled to said header system via a fastening system, said fastening system having a fastener extending through said header lock and said slot of said channel, said fastener threadedly engaging a nut such that said fastening system engages and retains said header lock in a position relative to said header.

13. The tonneau system according to claim 11 wherein said header lock comprises:
   a body portion having a width being greater than said width of said slot;
   an elbow portion extending from an end of said body portion, said elbow portion having a width that is less than a width of said slot and extending through said slot; and
   a head portion extending from said elbow portion, said head portion having a width greater than said width of said slot.

14. The tonneau system according to claim 13 wherein said elbow portion is engageable with said header retaining member when said header lock is in said locked position.

15. The tonneau system according to claim 11 wherein said header retaining member comprises:
   a body portion having a distal engaging portion; and
   a slot guide member extending from said body portion, said slot guide member being received and slidably retained within said channel, a portion of said slot guide member extending through said slot of said channel,
   wherein said body portion and said slot guide member together are positionable into said header engaging position coupling said header system to said side rail such that said distal engaging portion engages said side rail and positionable into said header disengaging position.

16. The tonneau system according to claim 15 wherein said body portion of said header retaining member further comprises an abutment portion disposed opposite of said distal engaging portion, said abutment portion being engageable with said header lock in said locked position.

17. The tonneau system according to claim 15 wherein said distal engaging portion comprises a tapered end portion.

18. The tonneau system according to claim 15 wherein said slot guide comprises a cantilevered portion extending therefrom.

19. The tonneau system according to claim 11 wherein said header lock moves in a first direction between said locked position and said unlocked position, said header retaining member moves in a second direction between said header engaging position and said header disengaging position, said first direction being orthogonal to said second direction.

\* \* \* \* \*